United States Patent [19]
Belfiore et al.

[11] Patent Number: 5,886,699
[45] Date of Patent: *Mar. 23, 1999

[54] METHOD AND SYSTEM FOR TRANSFERRING DATA TO COMMON DESTINATIONS USING A COMMON DESTINATION LIST

[75] Inventors: Joseph D. Belfiore, Redmond; Christopher J. Guzak, Kirkland; Chee Heng Chew, Redmond; Mark A. Malamud, Seattle; Royce A. Levien, Bellevue, all of Wash.

[73] Assignee: Microsoft Corporation, Redmond, Wash.

[ * ] Notice: The term of this patent shall not extend beyond the expiration date of Pat. No. 5,694,563.

[21] Appl. No.: 903,213

[22] Filed: Jul. 21, 1997

Related U.S. Application Data

[63] Continuation of Ser. No. 566,884, Nov. 16, 1995, Pat. No. 5,694,563, which is a continuation of Ser. No. 354,586, Dec. 13, 1994, abandoned.

[51] Int. Cl.⁶ .................................................... G06F 15/00
[52] U.S. Cl. ........................... 345/352; 345/348; 345/349; 345/353; 345/354
[58] Field of Search .................................. 345/347, 352, 345/353, 348, 349, 354

[56] References Cited

U.S. PATENT DOCUMENTS

| | | | |
|---|---|---|---|
| 5,140,677 | 8/1992 | Fleming et al. | 395/159 |
| 5,345,550 | 9/1994 | Bloomfield | 395/156 |
| 5,347,295 | 9/1994 | Agulnick et al. | 345/156 |
| 5,396,264 | 3/1995 | Falcone et al. | 345/352 |
| 5,420,975 | 5/1995 | Blades et al. | 345/352 |
| 5,438,433 | 8/1995 | Reifman et al. | 358/468 |
| 5,438,660 | 8/1995 | Lee et al. | 395/155 |
| 5,588,105 | 12/1996 | Foster et al. | 345/326 |

OTHER PUBLICATIONS

Tyne, Maria E., "Thinking Person's Guide to OS/22.1," *A Wiley–QED Publication*, John Wiley & Sons, Inc., pp. 55–68, 1993.

*DaVinci eMail User's Guide*, Version 2.0, pp. 114–120 1992.

*Primary Examiner*—Ba Huynh
*Attorney, Agent, or Firm*—Seed and Berry LLP

[57] ABSTRACT

A method and system for transferring data to common destinations using a common destination list is provided. In a preferred embodiment, a user uses a software facility ("the facility") that is preferably integrated into an operating system to transfer source objects using a list of common transfer destinations. By selecting a source object and issuing a transfer command, the user causes the facility to display in conjunction with the source object a list of common transfer destinations ("common destination list"). When the user selects a destination from the common destination list, the facility initiates a transfer of the source object to the selected destination. The destinations contained in the common destination list are preferably customizable by the user in a straightforward manner. In a further preferred embodiment, the facility monitors object transfers that the user specifies using other techniques, such as drag and drop, and prompts the user to automatically add frequently-used destinations to the common destination list.

12 Claims, 10 Drawing Sheets

METHOD AND SYSTEM FOR TRANSFERRING DATA TO COMMON DESTINATIONS USING A COMMON DESTINATION LIST

CROSS-REFERENCE TO RELATED APPLICATION

This application is a continuation of U.S. patent application Ser. No. 08/566,884, filed Nov. 16, 1995, now U.S. Pat. No. 5,694,563, which was a continuation of U.S. patent application Ser. No. 08/354,586 filed Dec. 13, 1994, now abandoned.

TECHNICAL FIELD

The invention relates generally to a method and system for transferring data, and, more specifically, to a method and system for transferring data to common destinations using a common destination list.

BACKGROUND OF THE INVENTION

In recent years, it has become increasing common for human users to use graphical user interfaces ("GUIs") to operate general-purpose computer systems. Such modern graphical user interfaces utilize a concept called "desktop metaphor," in which "objects" of all types are represented graphically as pictorial icons. Many kinds objects may exist within a computer system. Some kinds of objects, such as document objects, contain data. Other objects include programs, locations within intra-machine or intermachine file systems, or representations of peripheral devices connected to the computer system.

According to a user input technique called "drag and drop," GUI users may specify a data transfer by using a pointing input device such as a mouse to "drag" an icon representing an object containing data onto an icon representing an object that may receive data and "drop" it there. The object that is dragged is called the "source object." The object upon which the source object is dropped is called the "destination object." As a result of the drag and drop operation, a default data-receiving method of the destination object is invoked upon the source object. Thus, by dropping a source object on a program object, a user may open the source object for editing using that program object; by dropping it on a file system location object, the user can cause a copy of the source object to be created at the file system location associated with the file system location object; by dropping it on a peripheral device object, a user may perform a common function associated with the peripheral device on the source object, e.g., by dropping the source object on a printer object, the user may print the source object on the printer associated with the printer object, while, by dropping the source object on a modem object, the user may transmit the source object to another computer system using the modem associated with the modem object. Depending on the identities of the source and destination object, and any preference expressed by the user after the drag and drop, the source object may continue to exist independent of the destination object (in which case the drag and drop operation is characterized as a "copy") or the source object may be deleted (in which case the drag and drop operation is characterized as a "move"). The specific handling of drag and drop operations is determined in each case by the destination object.

While drag and drop operations perform an important function within GUIs that support them, they can be difficult for users to carry out. First, a user must ensure that the icons representing the source and destination objects are both visible. In each case, this may involve traversing an extensive hierarchy of all of the objects within the computer system, a potentially time-consuming process that is exacerbated when the objects' locations in the hierarchy are unknown. Second, the user must drag the source object onto the destination object and drop it there, a process that requires a fair amount of dexterity. In order to perform the drag and drop, the user must depress a button on the pointing device while the pointing device is pointing at the icon representing the source object, then hold the button down while moving the pointing device to point to the destination object, then release the button while the pointing device is pointing at the destination object. In practice, while it is relatively straightforward for a user to move the pointing device to point at the source object and depress the button, it is difficult, especially for novice users, to move the positioning device with the button held down and release the button only when the pointing device is pointing to the destination object.

SUMMARY OF THE INVENTION

It is an object of the invention to provide a method and system in a computer system for specifying a destination for an object transfer using a common destination list.

It is another object of the invention to provide a method and system in a computer system for allowing the manual customization of a common destination list by a user.

It is a further object of the invention to provide a method and system in a computer system for automatically adding frequently-used destinations to the common destination list.

These and other objects, which will become apparent as the invention is more fully described below, are provided by a method and system for transferring data to common destinations using a common destination list. In a preferred embodiment, a user uses a software facility ("the facility") that is preferably integrated into an operating system to transfer source objects using a list of common transfer destinations. By selecting a source object and issuing a transfer command, the user causes the facility to display in conjunction with the source object a list of common transfer destinations ("common destination list"). When the user selects a destination from the common destination list, the facility initiates a transfer of the source object to the selected destination. The destinations contained in the common destination list are preferably customizable by the user in a straightforward manner. In a further preferred embodiment, the facility monitors object transfers that the user specifies using other techniques, such as drag and drop, and prompts the user to automatically add frequently used destinations to the common destination list.

DETAILED DESCRIPTION OF THE INVENTION

A method and system for transferring data to common destinations using a common destination list is provided. In a preferred embodiment, a user uses a software facility ("the facility") that is preferably integrated into an operating system to transfer source objects using a list of common transfer destinations. By selecting a source object and issuing a transfer command, the user causes the facility to display in conjunction with the source object a list of common transfer destinations ("common destination list"). When the user selects a destination from the common destination list, the facility initiates a transfer of the source object to the selected destination. The destinations contained in the common destination list are preferably customizable by the user in a straightforward manner. In a further preferred embodiment, the facility monitors object transfers that the user specifies using other techniques, such as drag and drop, and prompts the user to automatically add frequently-used destinations to the common destination list.

Figure 1:
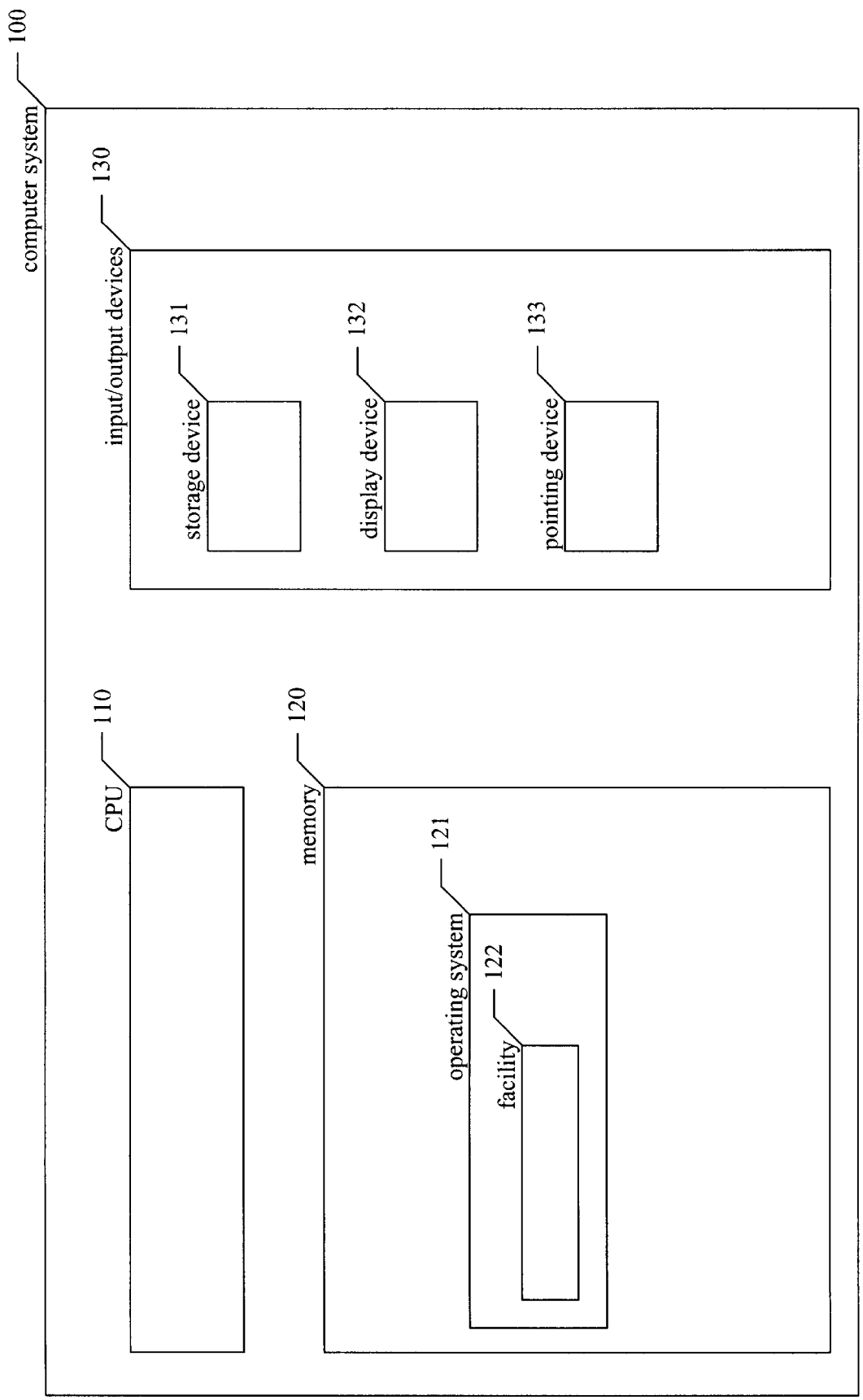
FIG. 1 is a high-level block diagram of the general-purpose computer system upon which the facility preferably operates.

FIG. 1 is a high-level block diagram of the general-purpose computer system upon which the facility preferably operates. The computer system 100 contains a central processing unit (CPU) 110, input/output devices 120, and a computer memory (memory) 130. Among the input/output devices 120 are a storage device 121, such as a hard disk drive; a display device 132, such as a video monitor; and a pointing device 123, such as a mouse. The facility 122 is preferably integrated into an operating system program (operating system) 121, which resides in the memory 130 and executes on the CPU 110. While the facility is preferably implemented on a computer system configured as described above, one skilled in the art will recognize that it may also be implemented on computer systems having different configurations.

Figure 2A:
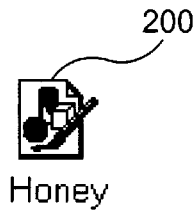
FIGS. 2A–2E are display drawings that show the operation of the facility to transfer a source object to a destination object using the common destination list.
Figure 2B:
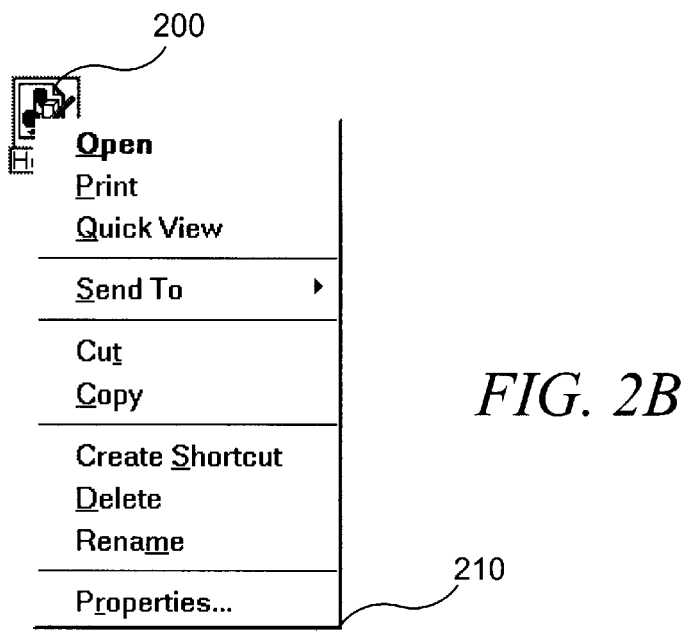
Figure 2C:
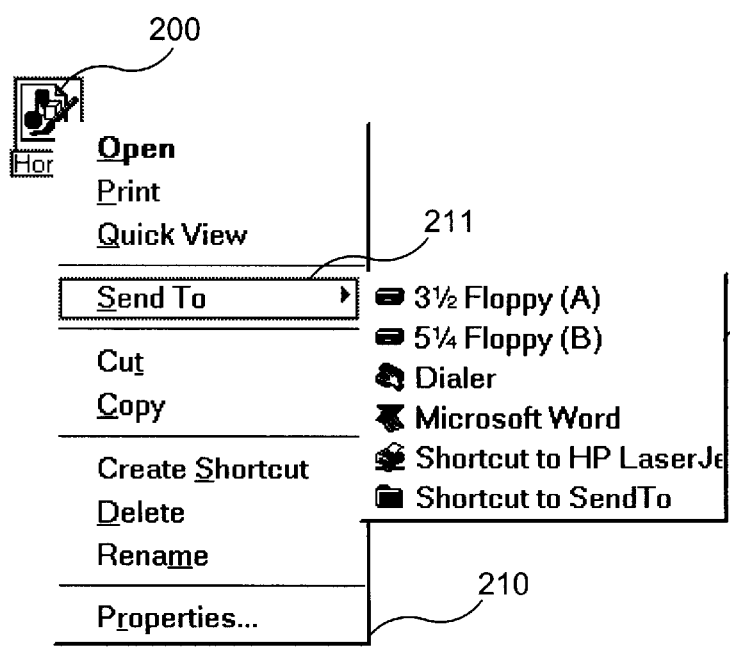
Figure 2D:
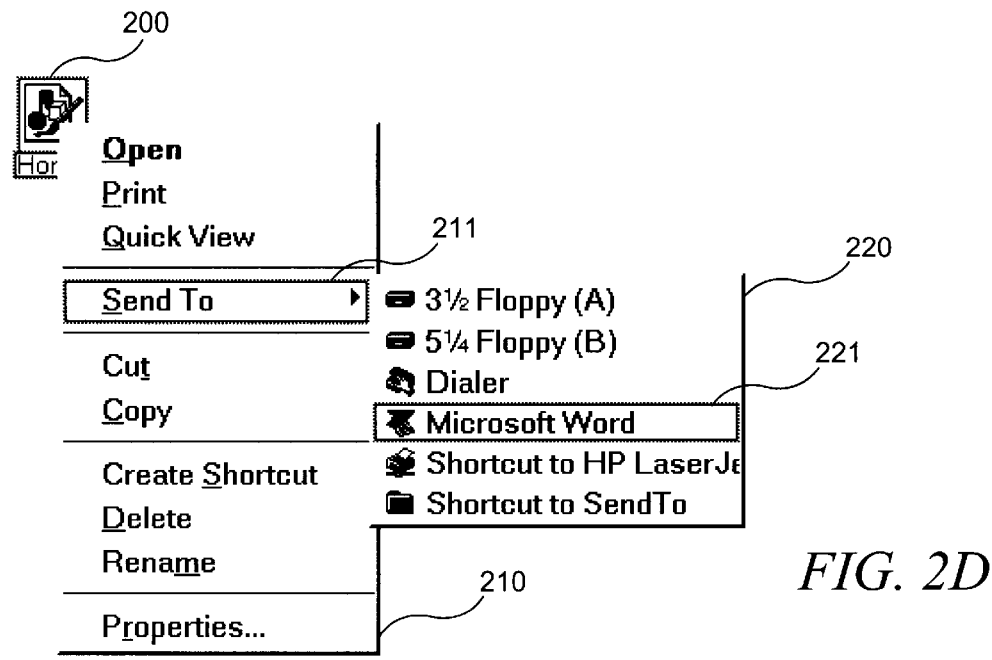
Figure 2E:
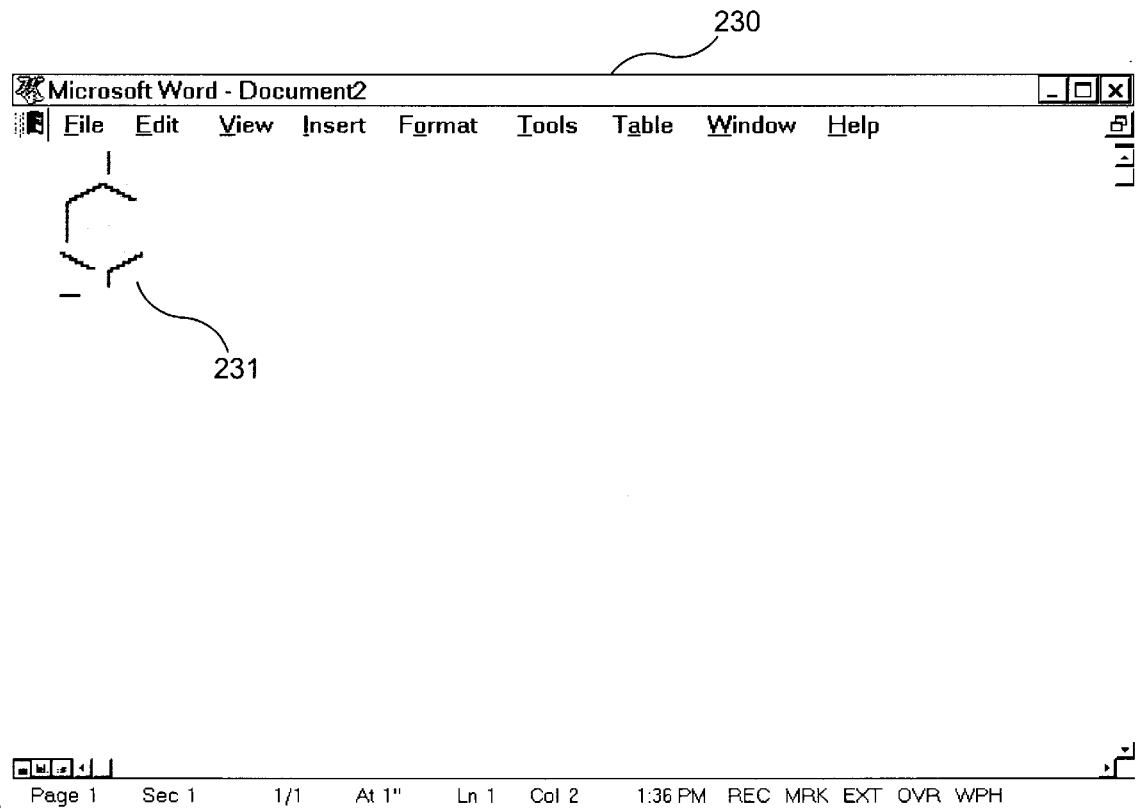

FIGS. 2A–2E are display drawings that show the operation of the facility to transfer a source object to a destination object using the common destination list. FIG. 2A shows the source object 200. The source object 200 is a bitmap object, containing a picture of a honeycomb cell. In FIG. 2B, the user has used the mouse to select the source object 200. In response to the user's selection of the source object 200, the facility displays in conjunction with the source object 200 a context menu 210. The context menu 210 is comprised of a list of commands that the user may apply to the source object. The user applies a command from the context menu 210 by selecting the command with a mouse. FIG. 2C shows the selection of the "send to", or transfer, command 211 from the context menu 210. The user may also issue the send to or transfer command in other ways, such as selecting the send to or transfer command from a pull-down menu after the source object 200 has been selected. In response, the facility displays the common destination list 220. The common destination list 220 contains a list of frequently used destinations. These include container destinations, such as "3½ Floppy (A)", "5¼ Floppy (B)", and "Shortcut To Send To" Folder. The common destination list also includes non-container, executable destinations such as "Dialer", "Microsoft Word", and "Shortcut to HP Laser Jet". At this point, the user may select any of the destinations displayed in the common destinations list in order to transfer the source object 200 to that destination. FIG. 2D shows the user selecting the Microsoft Word destination 221 in order to transfer the source object 200 to the Microsoft Word destination. FIG. 2E shows that, in response, the facility transfers the source object 200 to the Microsoft Word destination by invoking the Microsoft Word executable object to open the source object 200. FIG. 2E shows a Microsoft Word Window 230 that contains a new Microsoft Word document, which in turn contains the contents of the source object 200, a picture of a bitmap 231.

Figure 3:
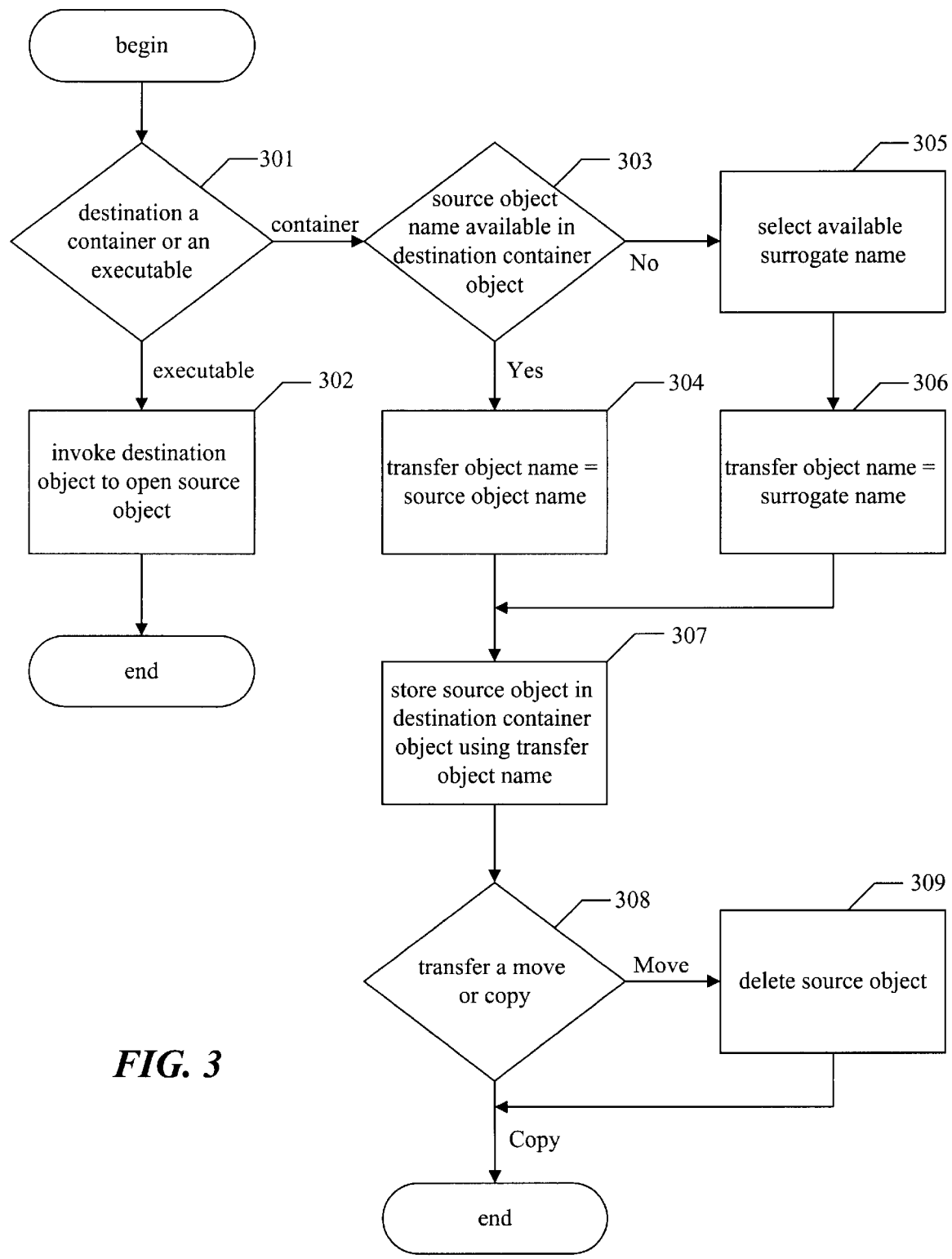
FIG. 3 is a flow diagram showing the steps preferably performed by the facility in order to perform a transfer of a source object to a destination object selected from the list of common destination objects by the user.

FIG. 3 is a flow diagram showing the steps preferably performed by the facility in order to perform a transfer of a source object to a destination object selected from the list of common destination objects by the user. These steps closely parallel conventional drag and drop data transfer implementations, including conforming implementations of the Drop method of the IDropTarget Object Linking and Embedding interface, described in the OLE 2 Programmer's Reference, v.1, pp. 682–684, 1994, which is hereby included by reference. In step 301, if the destination object is an executable, such as an application program, then the facility continues at step 302, else the destination object is a container object such as a storage device or a folder within a storage device, and the facility continues at step 303. In step 302, the facility transfers the source object to the executable destination object by invoking the destination object to open the source object. The facility preferably performs step 302 by calling an invocation function of the operating system, such as the CreateProcess() function of the Microsoft Windows 95 operating system, which takes the identity of the executable destination object and the identity of the source object as parameters. For a complete discussion of the CreateProcess() function, see Preliminary Win32 Programmer's Reference: Application Programming Interface, Part 1, pp. 179–180, 1992, which is hereby incorporated by reference. If the executable destination object is already open, the facility preferably uses interprocess communications mechanisms in step 302 to instruct the executable destination object to open the source object (not shown). After step 302, these steps conclude.

In steps 303–309, the facility transfers the source object to a container destination object. A container object contains other objects. Each of the contained objects has a name, which in many operating systems must be unique within the container. If the container destination object already contains an object having the same name as the source object, the name of the source object is no longer available for use in the container destination object. In step 303, if the name of the source object is available in the destination container object, then the facility continues at step 304, else the facility continues at step 305. In step 304, the facility sets the name that the source object will have when transferred to the destination object equal to the source object name. In step 305, the facility selects a surrogate name for the object that is available within the container. Step 305 preferably involves making minor nations in the source object name until the modified name is available in the destination container object. In step 306, the facility sets a transfer object name equal to the surrogate name generated in step 305. In step 307, the facility stores the source object in the destination container object using the transfer object name. Step 307 preferably involves using file system commands of the operating system to copy the source object to the destination container object, specifying the transfer object name. In the Microsoft Windows 95 operating system, this involves calling an Icreate() function with the transfer object name in order to create the transfer object calling an Iread() function in order to read data from the source object, calling an Iwrite() function in order to write the data read from the source object to the transfer object, and calling an IcloseO function in order to conclude the file operations.

The transfer performed by the facility may either be a move-type transfer ("move"), in which case the source object is copied to the transfer object and the source object is deleted, or a copy-type transfer ("copy"), in which the source object is copied to the transfer object and the source object is not deleted. The type of each transfer is preferably determined according to a preference for either a move or a copy expressed by the user by holding down command keys while selecting a destination from the common destination list. If the user expresses no preference for a transfer, the type of the transfer is determined by default rules. According to the default rules, if the source and destination objects are stored on the same storage device, the type of the transfer is a move, and if the source and destination objects are stored on different storage devices, the type of the transfer is a copy. In step 308, if the transfer is a move, then the facility continues at step 309, else these steps conclude. In step 309, the facility deletes the source object. These steps then conclude.

In some cases, the transfer of certain source objects directly to destination objects is inadvisable. For example, some operating systems have dependency on a group of objects known as "singular objects", which requires that each singular object is contained in a particular container object, and that no other copies of it are contained in other container objects. In such cases, instead of directly transferring the source object to the destination object, the facility preferably transfers a transformed source object to the destination object. The transformed source object transferred by the facility is preferably a surrogate object, also known as a "shell link", or a "shortcut". The surrogate object constitutes a reference to the source object, permitting users in programs accessing the surrogate object to access the source object. A more detailed technical explanation of surrogate objects is provided below.

Figure 4A:
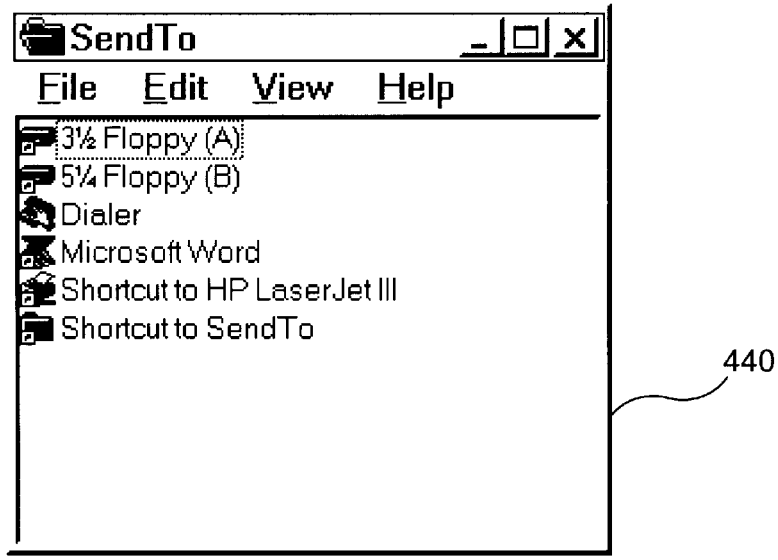
FIGS. 4A–4E are display diagrams showing how the user may manually customize the common destination list.
Figure 4B:
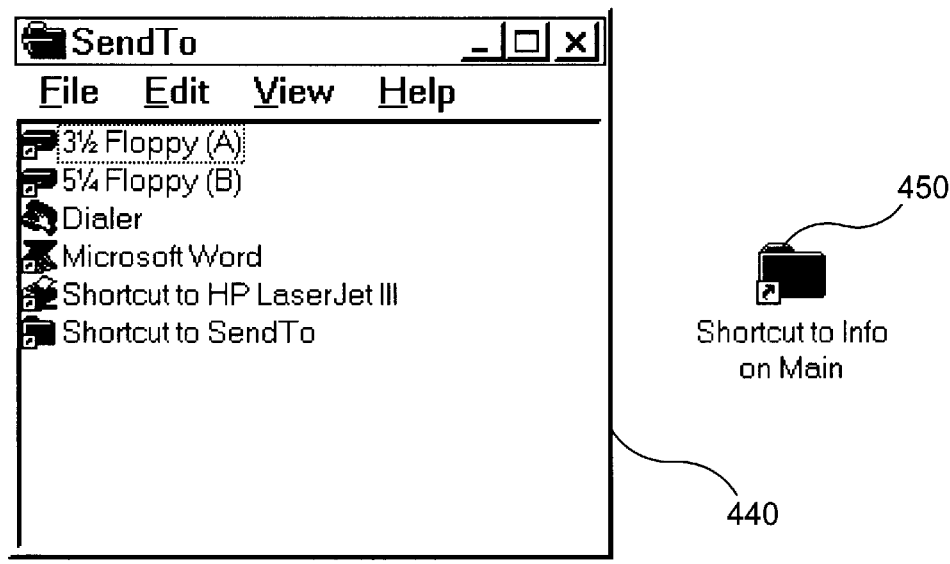
Figure 4C:
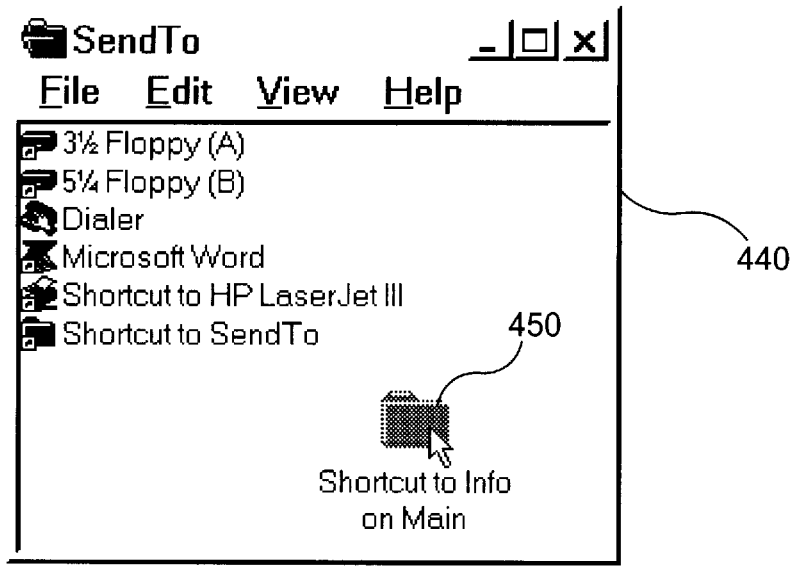
Figure 4D:
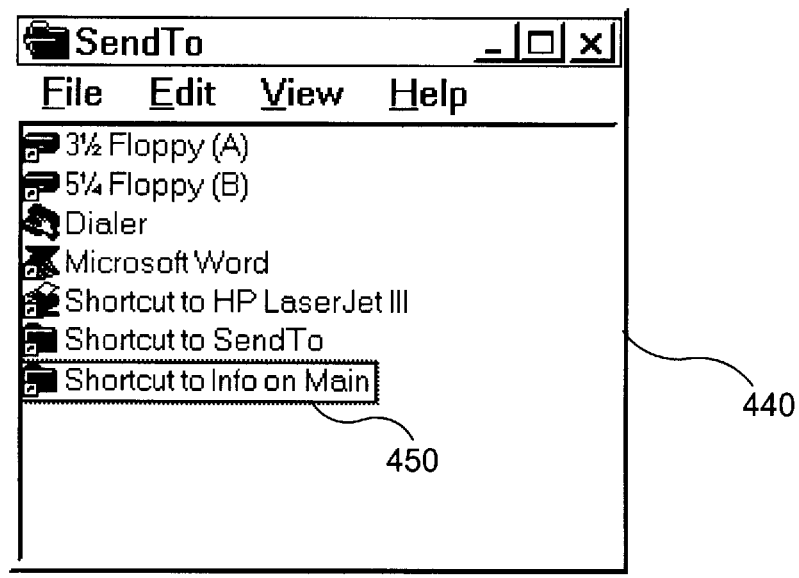
Figure 4E:
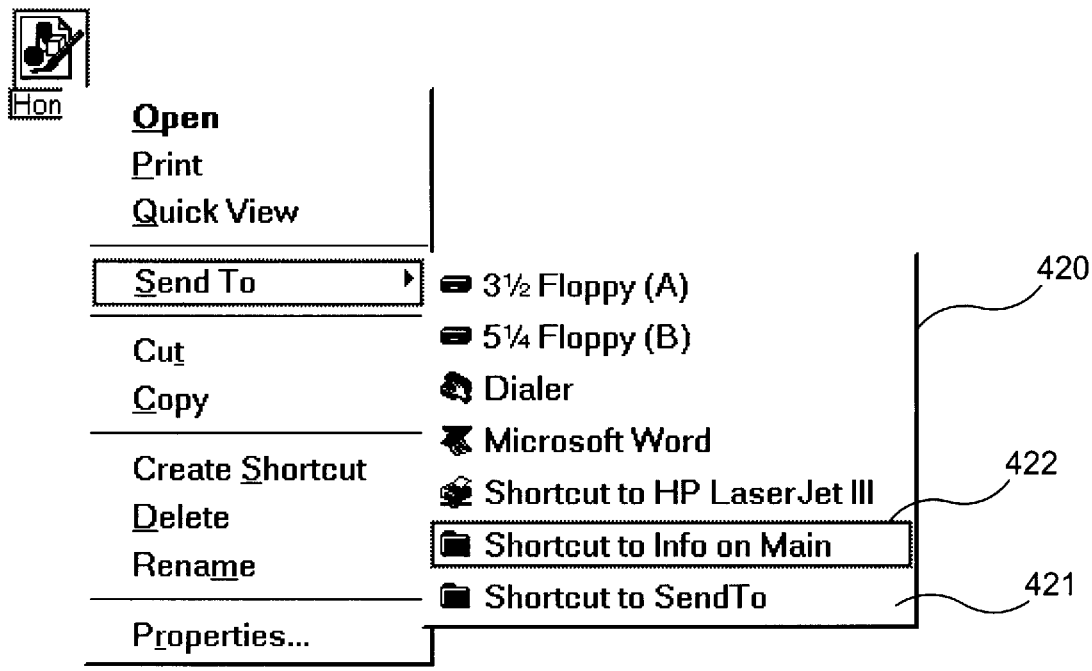

The user may manually customize the common destination list, as shown in FIGS. 4A–4E. As shown in FIG. 4A, the facility preferably stores the destination objects comprising the common destination list together in a special "send to" folder 440. It can be seen that the objects contained in the "send to" folder 440 correspond to the common destination list 220 (FIG. 2). Therefore, in order to add destinations to or remove destinations from the common destination list, the user may transfer objects to or remove objects from the "send to" folder 440. As an example, FIG. 4B shows an added object 450 that the user wishes to add to the common destination list. In order to do so, the user transfers the added object 450 to the "send to" folder 440 as shown in FIG. 4C. The "send to" folder 440 then contains the added object 450, as shown in FIG. 4D. FIG. 4E shows that when the user selects the source object, then the transfer command, the common destination list 420 displayed by the facility contains the added destination 422. The process of adding a destination to the common destination list is further streamlined by the inclusion of the "send to" folder in the common destination list (421). This permits the user to add a new destination to the common destination list by selecting the new destination object and using the facility to transfer the new destination object to the "send to" folder 440, causing the new destination to appear on the destination list.

Figure 5A:
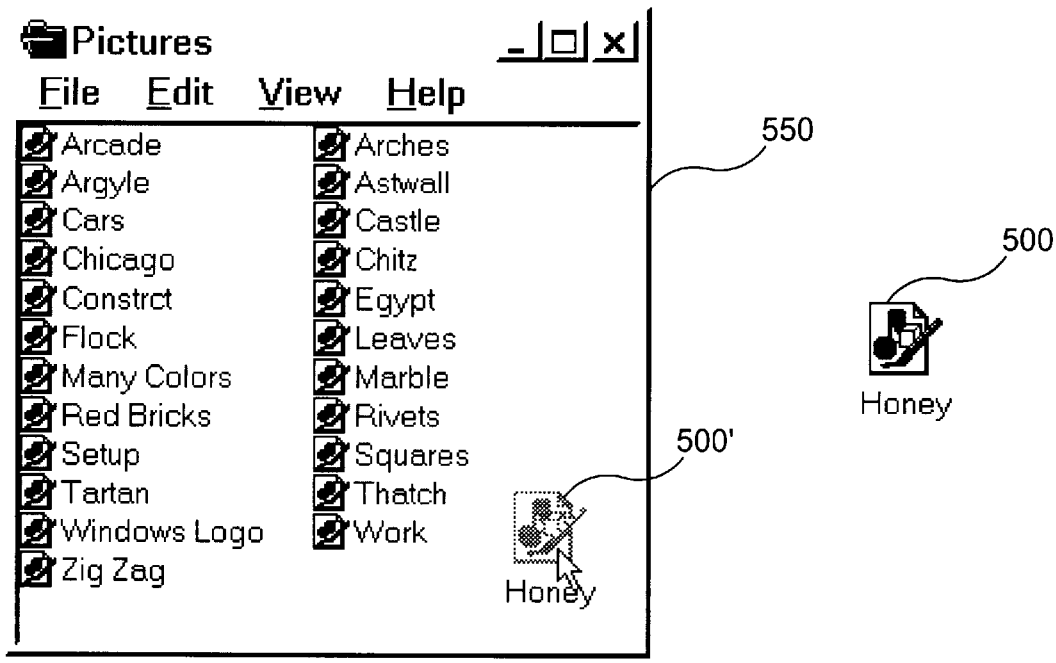
FIGS. 5A–5D are display diagrams that show the facility automatically adding to the common destination list a destination used frequently by the user.
Figure 5B:
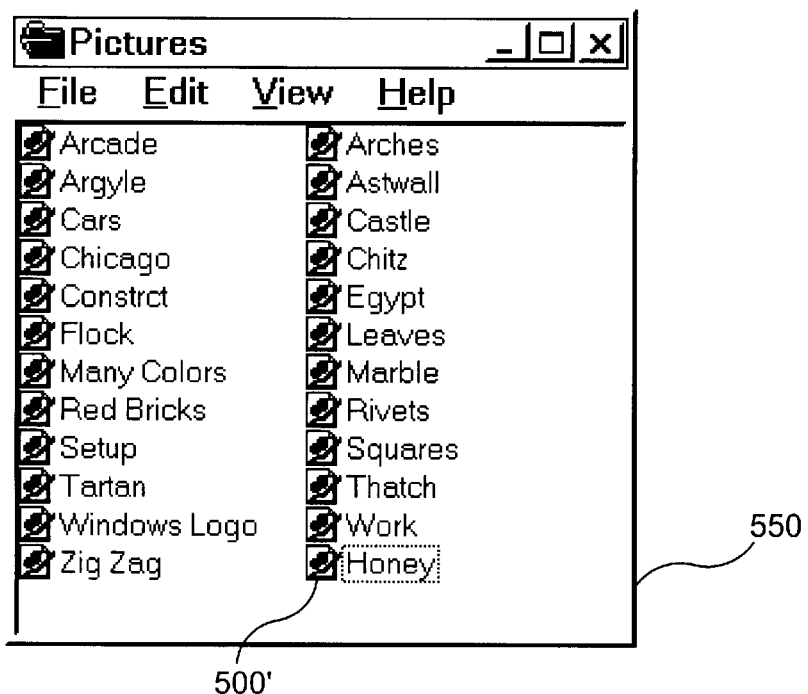
Figure 5C:
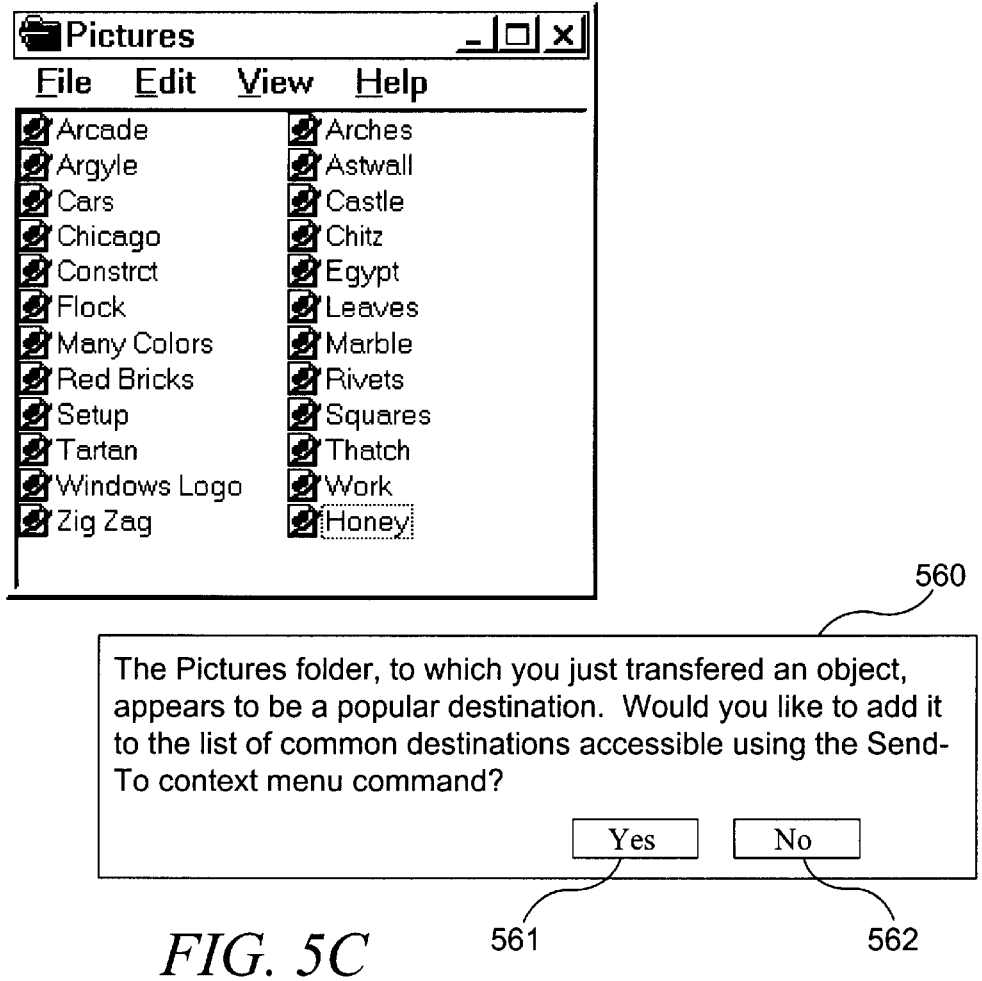
Figure 5D:
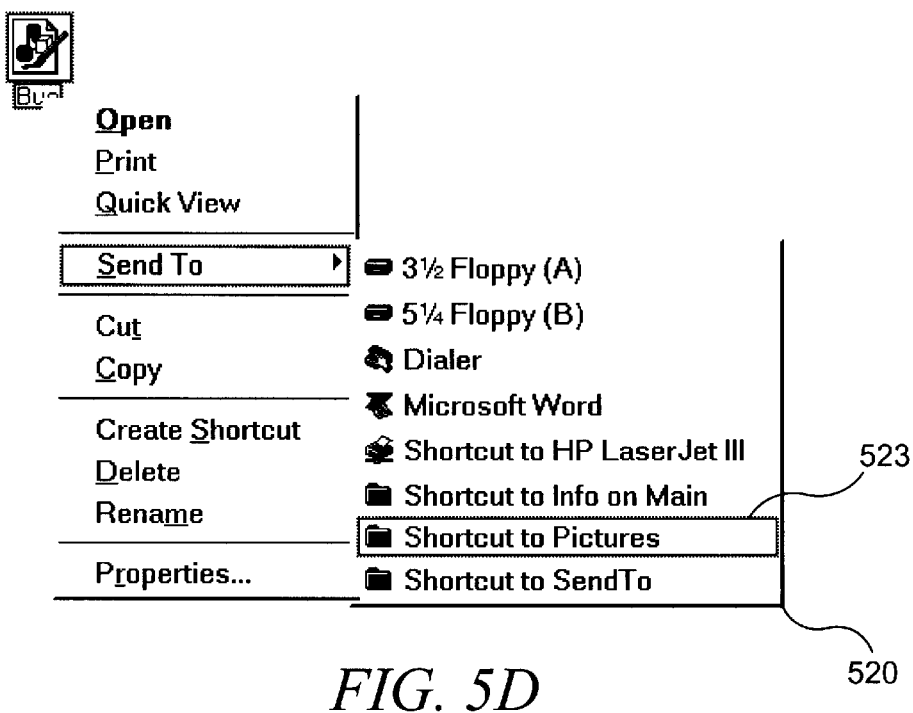

The facility also preferably adds frequently-used destination to the common destination list automatically. FIGS. 5A–5D are display diagrams that show the facility automatically adding to the common destination list a destination used frequently by the user. In FIG. 5A, the user is using the drag and drop technique to transfer a honey bitmap object 500 to a Pictures folder 550, as shown by a "ghost" object 500' inside the pictures folder 550. FIG. 5B shows that, as a result of the drag and drop operation, the honey bitmap object has been moved to the Pictures folder 550. In response to the drag and drop operation, the facility increments a count of the number of times that the Pictures folder has been the destination of an object transfer. Once incremented, the count for the Pictures folder exceeds a threshold number of times. As shown in FIG. 5C, the facility therefore displays a visual prompt 560, informing the user that the Pictures folder has been used as a destination a relatively large number of times, and asking whether the user would like to add the pictures folder to the common destination list. At this point, the user may select either a yes button 561 or no button 562. If the user selects the yes button 561, then the Pictures folder 523 is added to the common destination list 520 as shown in FIG. 5D. If the user selects the no button 562, then the facility reduces the count for the Pictures directory so that the user will have to transfer several more objects to the Pictures folder before its count again exceeds the threshold and the facility displays visual prompt 560.

Figure 6:
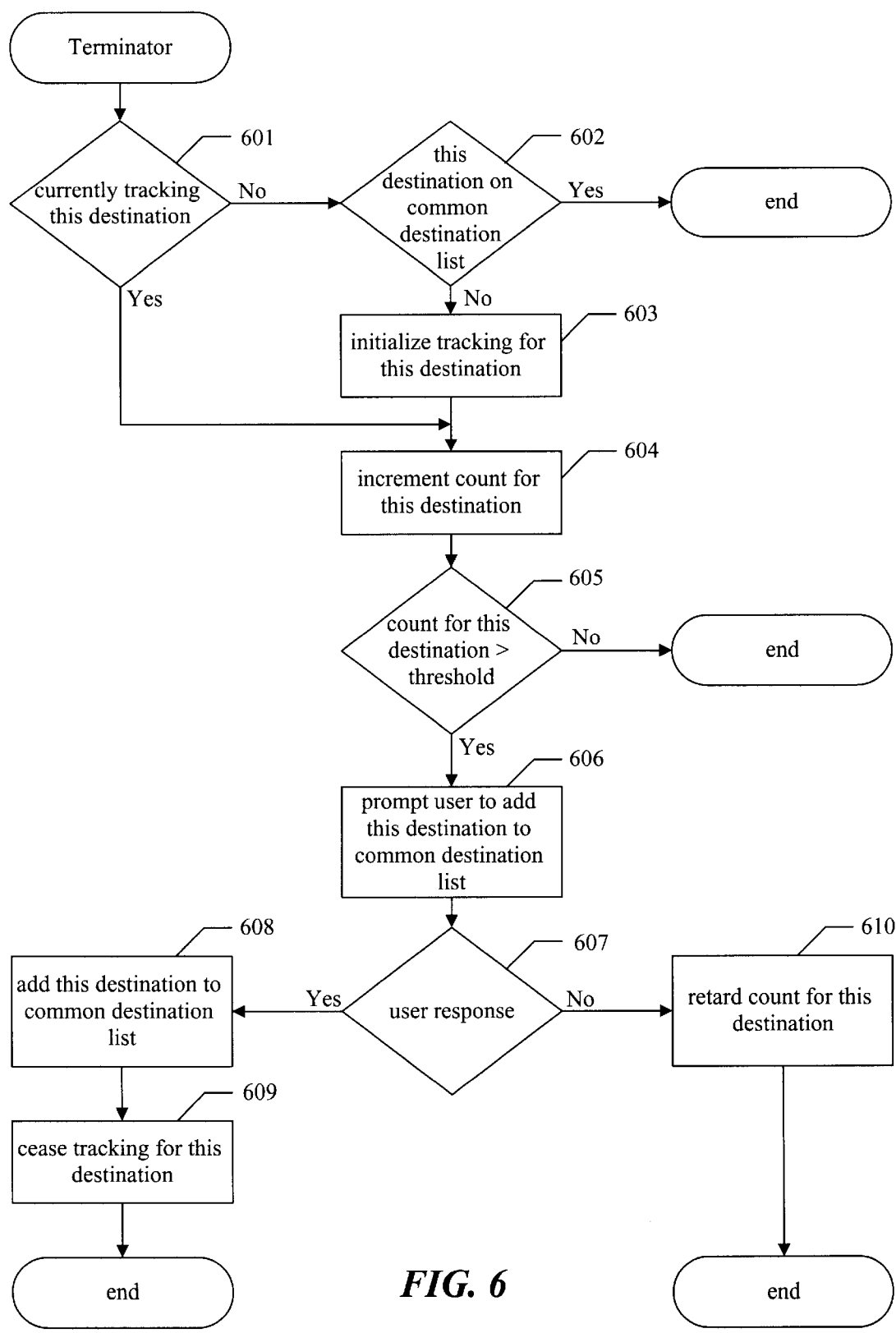
FIG. 6 is a flow diagram of the steps preferably performed by the facility in order to automatically add to the common destination list destinations to which the user frequently transfers objects.

FIG. 6 is a flow diagram of the steps preferably performed by the facility in order to automatically add to the common destination list destinations to which the user frequently transfers objects. These steps are preferably performed each time the user specifies an object transfer in a way other than selecting a destination from the common destination list, e.g., when the user transfers an object using the drag and drop technique. In step 601, if the facility is currently tracking the destination object specified by the user, then the facility continues its step 604, else the facility continues its step 602. In step 602, if this destination is already on the common destination list, then it is unnecessary to track this destination and these steps conclude, else the facility continues at step 603. In step 603, the facility initializes tracking for this destination. Step 603 preferably involves storing an entry in a tracking file identifying the destination and having a counter indicating that this destination has been used zero times. In step 604, the facility increments the count for this destination to indicate that this destination has been used an additional time. In step 605, if the count for this destination now exceeds a threshold count, then the facility continues at step 606, else these steps conclude. In step 606, the facility visually prompts the user to add this destination to the common destination list. In step 607, if the user responds that this destination should be added to the common destination list, the facility continues at step 608, else the facility continues at step 610. In step 608, the facility adds this destination to the common destination list. Step 608 preferably involves writing an indication of the identity of this destination to a file representing the common destination list. In step 609, the facility ceases tracking for this destination. Step 609 preferably involves deleting an indication of the identity of this destination from the tracking file. These steps then conclude. In step 610, the facility retards the count for this destination by reducing it to a smaller number, ensuring that the user will need to transfer several more objects to this destination before the facility prompts the user again in step 606 to add this destination to the common destination list. These steps then conclude.

While this invention has been shown and described with reference to preferred embodiments, it will be understood by those skilled in the art that various changes or modifications in form and detail may be made without departing from the scope of the invention. For example, many different methods can be used for tracking the frequency of use of destinations, including comparing the number of times a particular destination is used to a threshold percentage of the total number of tracked transfers instead of a threshold number of times. Further, the facility, in addition to automatically adding frequently-used destinations to the common destination list, may automatically remove infrequently-used destinations OAlso, the facilitation list. Also, the facility may permit the user to issue a transfer command in other manners than using the context menu. For example, the facility may permit the user to issue a transfer command by performing a user input gesture with respect to the object. A detailed technical explanation of surrogate objects, or "shell links", follows:

SHELL LINKS

About Shell Links

A shell link (also called a shortcut) is an object n the Windows 95 shell that provides quick access to another object, typically located elsewhere in the shell. The user can use a shell link to access the corresponding object without needing to know the current name and location of the object. For example, the user could create a shell link to a Microsoft Word document and place the link on the desktop. The user could then start Word and open the document simply by double clicking the shell link. The user can create shell links to many different types of objects, including files, directories, and printers.

The user directs the shell to create a shell link by right clicking an object and selecting Create Shortcut from the resulting context menu. An application directs the shell to create a shell link by calling functions provided by the shell's IShellLink interface. This article describes the IShellLink interface and explains how to implement the interface to create and resolve shell links from within a Windows application. Note that the IShellLink interface is provided for the Windows 95 shell. The steps you take to exploit the Windows 95 shell may not be the same steps that you will take to exploit the shell in future versions of the Windows operating system. Because the design of shell links is based on the Component Object Model in object linking an embedding (OLE) version 2.0, you should be familiar with the basic concepts of the Component Object Model and OLE programming before reading this article. For more information about the Component Object Model and OLE programming, see the *OLE 2.0 Programmer's Reference*.

Link Files

Windows stores information about a shell link in a link file—a hidden, binary file that has the .LNK extension. The link file for a shell link located on the Windows desktop is stored in the Desktop subdirectory of the Windows directory. The link file for a shell link in a folder is stored in the directory that corresponds to the folder. A link file includes the following information:

u The location (path) of the object referenced by the shell link (called the corresponding object in this chapter)

u The working directory of the corresponding object u The list of arguments that the system passes to the corresponding object when the user selects the shell link u The show command (SW—used to set the initial show state of the corresponding object u The location (path) of the shell link's icon u The description string of the shell link u The hot key for the shell link The system automatically deletes a link file when the corresponding object is deleted. However, when a link file is deleted, the corresponding object is not affected.

If you create a shell link to another shell link, the system simply copies the link file—it does not create a new link file. This is important if you are assuming that the shell links will remain independent of each other.

Location

A shell link can exist on the desktop or anywhere in the shell's name space, which is the hierarchical structure of objects in the shell. Similarly, the object that is associated with the link can also exist anywhere in the shell's name space. An application can use the IShellLink::SetPath member function to set the path to the associated object, and IShellLink::GetPath to retrieve the current path to the object.

If the name or location of the associated object changes after a shell link is created, the system automatically updates the link with the new name or location. Updating a shell link when the corresponding object's name or location changes is referred to as resolving the link. An application can direct the shell to resolve a shell link at any time by calling the IShellLink::Resolve member function.

When a shell link is created, the system saves information about the link. When an application calls IShellLink::Resolve, the system first retrieves the path associated with the shell link by using a pointer to the shell link's ID list. The system searches for the associated object in that path and, if it finds the object, resolves the link. If the system cannot find the object, it looks in the same directory for an object that has the same file creation time and attributes, but a different name. This method resolved a link to an object that has been renamed. If the system still cannot find the object, it searches the subdirectories of the current directory, searching recursively though the directory tree looking for a match with either the name or creation time. If the system does not find a match it displays a dialog box prompting the user for a location. An application can suppress the dialog box by specifying the SLR_NO_UI flag when calling IShellLink::Resolve.

Working Directory

The working directory is the directory where the corresponding object of a shell link loads or stores files when the user does not identify a specific a directory. A link file stores the working directory for the corresponding object. An application can set the working directory for the corresponding object by using the IShellLink::SetWorkingDirectory member function. It can use IShellLink::GetWorkingDirectory to retrieve the current working directory for the corresponding object.

Arguments

A link file contains command line arguments that the shell passes to the corresponding object when the user selects the link. An application can set the command line arguments for a shell link by using the IShellLink::SetArguments member function. Setting the command line arguments is useful when the corresponding application takes special flags as arguments, such as with a linker or compiler. An application can retrieve the command arguments from a shell link by using IShellLink::GetArguments.

Show Command

When the user double-clicks a shell link, the system starts the application associated with the corresponding object, and sets the initial show state of the application based on a show command specified by the shell link. The show command can be any of the SW_commands included in the description of the ShowWindow function. An application can set the show command for a shell link by using the IShellLink::SetShowCmd member function. It can retrieve the current show command by using IShellLink::GetShowCmd.

Icon and Description

Like other shell objects, a shell link has an icon. The user accesses the object associated with a shell link by double-clicking the shell link's icon. When the system creates an icon for a shell link, it uses the bitmap of the corresponding object and adds a small arrow to the lower-left corner. An application can set the bitmap of a shell link by using the IShellLink::SetIconLocation member function. An application can obtain the current location of a shell link's icon by using IShellLink::GetIconLocation.

A shell link also has a description, which is a brief string that appears below the link's icon. By default, the description consists of the words "Shortcut to" followed by the filename of the object.

The user can edit the description by selecting it and entering a new string. An application can set the description by using the IShellLink::SetDescription member function, or retrieve the current description by using IShellLink::GetDescription.

Hot Key

A shell link object can have a hot key associated with it. A hot key allows the user to invoke the shell link by pressing a particular combination of keys. An application can set the hot key for a shell link by using the IShellLink::SetHotkey member function. It can retrieve the current hot key for a shell link by using IShellLink::GetHotkey.

Item Identifiers and Identifier Lists

The shell uses object identifiers within the shell name space. All of the objects that are visible in the shell (files, directories, servers, workgroups, and so on) have an identifier that is unique among the objects within the parent folder. These identifiers are called item IDs and have the SHITEMID data type as defined in the SHLOBJ.H header file. An item ID is a variable-length byte stream that contains information for identifying an object within a folder. Only the creator of an item ID knows the content and format of the ID. The only part of an item ID that the shell uses is the first two bytes, which specify the size of the ID.

Each parent folder has its own item identifier that identifies it within its own parent folder. Thus, any shell object can be uniquely identified by a list of item IDs. A parent folder keeps a list of identifiers for the items in the folder. The list has the type ITEMIDLIST. Item ID lists are allocated by the shell and may be passed across shell interfaces such as IShellFolder. It is important to remember that each item identifier in an ID list is only meaningful within the context of the parent folder.

An application can set the item ID list for a shell link by using the IShellLink::SetEDList member function. This function is useful when setting a shell link to an object that isn't a file, such as a printer or a disk drive. An application can retrieve a shell link's ID list by using IShellLink::GetIDList.

USING SHELL LINKS

This section contains code examples that demonstrate how to create and resolve shell links from within a Windows-based application.

Initialization

Before it can create and resolve shell links, your application must initialize the component object library by calling the CoInitialize function. Each call to CoInitialize requires a corresponding call to CoUnitialize, which your application should call when it terminates. Calling CoUnitialize ensures that the application does not terminate until it has received all of its pending messages.

Creating a Shell Link to a File

The example code in this <section> demonstrates how to create a shell link. The examples are from an application that includes a menu item called "Create shortcut" When the user selects the item, the application displays a dialog box that contains a list of the files in the current directory. The user creates a shell link to a file by selecting a filename from the list. The dialog box also includes a "Place shortcut on desktop" check box that allows the user to place the link on the desktop or in the current directory. The following example shows the code that fills the list box with file names:

```
// OnInitDialog - fills list box with file names
// Returns TRUE if successful or FALSE otherwise.
// hwndDlg - handle of the dialog box
BOOL OnInitDialog(HWND hwndDlg)
{
    char szCurDir[MAX_PATH];
    // Initialize the list box by filling it with filenames from
    // the current directory.
    if (!GetCurrentDirectory(MAX_PATH, szCurDir))
        return FALSE;
    if (!DlgDirList(hwndDlg, szCurDir,
        IDC_FILENAMES, 0, DDL_READWRITE))
        return FALSE;
    return TRUE;
}
```

After the user selects a file from the list and clicks the OK button, the application retrieves the selected filename from the listbox and queries the state of the check box. If the check box is checked, the application places the link on the desktop; otherwise, it places the link in the current directory. The system stores .LNK files for desktop links in a hidden subdirectory of the directory that contains windows system files.

To create the name of the shell link, the application calls the DlgDirSelectEx function to retrieve the selected file, and then replaces the file extension with ".LNK".

```
// PrepareLinkInfo - retrieves link information from the dialog box,
// creates the paths to the object and the link, and sets the link
// description.
// hwndDlg - handle of the dialog box
void PrepareLinkInfo(HWND hwndDlg)
{
    char szLink[MAX_PATH];
    char szFile[MAX_PATH];
    char szDesc[MAX_PATH];
    char szFileSel[MAX_PATH];
    char* pDot;
    // Get the path to the link and determine if it should be placed
    // on the desktop.
    if (IsDlgButtonChecked(hwndDlg, IDC_DESKTOP)) {
        // Get the path of the Windows directory.
        GetWindowsDirectory(szLink, MAX_PATH);
        // Append the name of the Desktop directory.
        lstrcat(szLink, "\‡Desktop");
    } else
        // Get the current directory.
        GetCurrentDirectory(MAX_PATH, szLink);
    // Get the selected item in the list box.
    DlgDirSelectEx(hwndDlg, szFile,
    MAX_PATH, IDC_FILENAMES);
    // Set the description.
    lstrcpy(szDesc, "Shortcut to ");
    lstrcat(szDesc, szFile);
    // Add the forward slash for the path
    lstrcat (szLink, "\\");
```

-continued

```
    // Add the file name.
    lstrcat (szLink, szFile);
    // Strip off the extension, if any.
    pDot = szLink;
    while (pDot) {
        if (*pDot == '.') {
            *pDot = (char) NULL;
            break;
        }
    }
    // Add the LNK extension.
    lstrcat (szLink, "LNK");
    // Get the path to the target directory.
    GetCurrentDirectory(MAX_PATH, szFileSel);
    lstrcat(szFileSel, "\\");
    lstrcat(szFileSel, szFile);
    // Create the link by calling CreateLink.
    CreateLink(szFileSel, szLink, szDesc);
    return;
}
```

The CreateLink function in the following example creates the shell link. The parameters include a pointer to the name of the file to link to, a pointer to the name of the shell link that you are creating, and a pointer to the description of the fink. The description consists of the string, "Shortcut to <filename>", where filename is the name of the file to link to.

Because CreateLink calls CoCreateInstance, it is assumed that CoInitialize has already been called. The CreateLink function uses the IPersistFile interface to save the shell link, and the IShellLink interface to store the filename and description.

```
// CreateLink - uses the shell's IShellLink and IPersistFile interfaces
//   to create and store a shell link to the specified object.
// Returns the result of calling the member functions of the interfaces.
// lpszPathObj - address of buffer containing the path of the object
// lpszPathLink - address of buffer containing the path where the shell
//   link is to be stored
// lpszDesc - address of buffer containing the description of the shell
//   link
HRESULT CreateLink(LPCSTR lpszPathObj,
    LPSTR lpszPathLink, LPSTR lpszDesc)
{
    HRESULT hres;
    IShellLink* psl;
    // Get a pointer to the IShellLink interface.
    hres = CoCreateInstance(&CLSID_ShellLink, NULL,
        LSCTX_INPROC_SERVER,
        &IID_IShellLink, &psl);
    if (SUCCEEDED(hres)) {
        IPersistFile* ppf;
        // Set the path to the shell link target and add the
        // description.
        psl->lpVtbl->SetPath(psl, lpszPathObj);
        psl->lpVtbl->SetDescription(psl, lpszDesc);
        // Query IShellLink for the IPersistFile interface for saving the
        // shell link in persistent storage.
        hres psl->lpVtbl->QueryInterface(psl, &IID_PersistFile,
            &ppf);
        if (SUCCEEDED(hres)) {
            WORD wsz[MAX_PATH];
            // Ensure that that string is ANSI.
            MultiByteToWideChar(CP_ACP, 0, lpszPathLink, -1,
                wsz, MAX_PATH);
            // Save the link by calling IPersistFile::Save.
            hres = ppf->lpVtbl->Save(ppf, wsz, STGM_READ);
            ppf->lpVtbl->Release(ppf);
        }
        psl->lpVtbl->Release(psl);
    }
    return hres;
}
```

RESOLVING A SHELL LINK

An application may need to access and manipulate a shell link that was created previously. This is referred to as "resolving" the shell link. The examples in this <section> show how to resolve a shell link. The following code creates a dialog box similar to the one used to create the shell link. The code fills the dialog with the names of the files in the current directory, prompts the user to select the link to resolve, and checks to ensure that the selected file has the .LNK extension.

```
void SelectResolveLink(HWND hwndDlg)
{
    char szLinkFile[MAX_PATH];
    char szPath(MAX_PATH];
    char* pDot;
    LPSTR lpszExt;
    // Get the current directory.
    GetCurrentDirectory(MAX_PATH, szPath);
    // Get the selected item from the list box.
    DlgDirSelectEx(hwndDlg, szLinkFile, MAX_PATH,
        IDC_FILENAMES);
    // Make sure the file has the .LNK extension.
    pDot = szLinkFile;
    while (pDot) {
        if (*pDot++ == '.') {
            lpszExt = pDot;
            break;
        }
    }
    if ((!lstrcmp(lpszExt, "LNK")) || (!lstrcrmp(lpszExt, "lnk")))
        // Make call to ResolveShortcut here.
        ResolveIt(GetFocus ( ), szLinkFile, szPath);
    return;
}
```

The ResolveIt function in the following example resolves the shell link. Its parameters include a window handle, a pointer to the path of the shell link, and the address of a buffer that receives the new path to the object. The window handle identifies the parent window for any message boxes that the shell may need to display. For example, the shell displays a message box if the link is on unshared media, if network problems occur, if the user needs to insert a floppy disk, and so on.

The ResolveIt function calls CoCreateInstance and assumes that CoInitialize has already been called. Notice that ResolveIt needs to call into the IPersistFile interface to store the link information. The IPersistFile interface is implemented by the IShellLink object. The link information must be loaded before retrieving the path information, which happens later in the code. Failing to load the link information causes the calls to IShellLink::GetPath and IShellLink::GetDescription to fail.

```
HRESULT ResolveIt(HWND hwnd, LPCSTR lpszLinkFile,
LPSTR lpszPath)
{
    HRESULT hres;
    IShellLink* psl;
    char szGotPath[MAX_PATH];
    char szDescription[MAX_PATH);
    WIN32_FIND_DATA wfd;
    *lpszPath = 0; // assume failure
    // Get a pointer to the IShellLink interface.
    hres = CoCreateInstance(&CLSID_ShellLink, NULL,
        CLSCTX_INPROC_SERVER, &IID_IShellLink, &psl);
    if (SUCCEEDED(hres)) {
        IPersistFile* ppf;
        // Get a pointer to the IPersistFile interface.
```

-continued

```
    hres = psl->lpVtbl->QueryInterface(psl, &IID_IPersistFile,
        &ppf);
    if (SUCCEEDED(hres)) {
        WORD wsz[MAX_PATH];
        // Ensure string is Unicode
        MultiByteToWideChar(CP_ACP, 0, lpszLinkFile, -1, wsz,
            MAX_PATH);
        // Load the shell link.
        hres = ppf->lpVtbl->Load(ppf, wsz, STGM_READ);
        if (SUCCEEDED(hres)) {
            // Resolve the link.
            hres = psl->lpVtbl->Resolve(psl, hwnd,
            SLR_ANY_MATCH);
            if (SUCCEEDED(hres)) {
                lstrcpy(szGotPath, lpszLinkFile);
                // Get the path to the link target.
                hres = psl->lpVtbl->GetPath(psl, szGotPath,
                    MAX_PATH,
                    (WIN32_FIND_DATA *)&wfd,
                    SLGP_SHORTPATH );
                if (!SUCCEEDED(hres)
                    HandleErr(hres);
                        // application-defined function
                // Get the description of the target.
                hres = psl->lpVtbl->GetDescription(psl,
                    szDescription, MAX_PATH);
                if (!SUCCEEDED(hres))
                    HandleErr(hres);
            }
        }
        // Release pointer to IPersistFile interface.
        ppf->lpVtbl->Release (ppf);
    }
    // Release pointer to IShellLink interface.
    psl->lpVtbl->Release(psl);
    }
    return hres;
}
```

CREATING A LINK TO A NON-FILE OBJECT

Creating a shell link to an object other than a file is similar to creating a shell link to a file. The main difference is that, rather than setting the path to the file, you must set the identification list (ID list) to the printer. To set the ID list, you must call the IShellLink::SetIDList member function, specifying the address of an ID list.

Each object within the shell's name space has an item identifier (ID), a variable-length byte stream containing information that identifies the object within its folder. The shell often concatenates item IDs into null-terminated lists consisting of any number of item IDs.

In general, if you need to set a shell link to an item that does not have a file name, such as a printer, you will already have a pointer to the object's IShellFolder interface. The IShellFolder interface is used to create name space extensions.

Namespace extensions are registered in three different ways. The first method uses information at the following location in the registry:

```
HKEY_LOCAL_MACHINE
    Software
        Microsoft
            Windows
                CurrentVersion
                    Explorer
                        Desktop
                            Namespace
                                <IShellFolder CLSID>
```

<IShellFolder CLSID> is the class identifier of the IShellFolder interface for objects registered in the Desktop's name space. The second method uses information at the following location in the registry:

```
HKEY_LOCAL_MACHINE
    Software
        Microsoft
            Windows
                CurrentVersion
                    Explorer
                        Computer
                            Namespace
                                <Namespace CLSID>
```

<Namespace CLSID> is the class identifier of the name space extension that handles objects registered in the computer's name space.

The third method involves creating a system-level directory (which will be hidden by default) and placing an initialization (.INI) file in that directory. The initialization file contains the class identifier for the name space extension that you are referencing.

Once you have the class identifier for the IShellFolder interface, you can call CoCreateinstance to get the address of the interface. Next, you can call the interface to enumerate the objects in the folder and retrieve the address of the item ID for the object that you are searching for. You can then use the address in a call to the IShellLink::SetIDList member function to create a shell link to the object.
Reference
IShellLink Interface that allows an application to create and resolve shell links. The IShellLink interface has the following methods:

| | |
|---|---|
| GetArguments | Retrieves arguments associated with a shell link object. |
| GetDescription | Retrieves the description string for a shell link object. |
| GetHotkey | Retrieves the hot key for a shell link object. |
| GetIconLocation | Retrieves the path and index of the icon for a shell link object. |
| GetIDList | Retrieves the list of item identifiers for a shell link object. |
| GetPath | Retrieves the path and filename of a shell link object. |
| GetShowCmd | Retrieves the show window (SW_) command for a shell link object. |
| GetWorkingDirectory | Retrieves the name of the working directory for a shell link object. |
| Resolve | Resolves a shell link by searching for the shell link object and updating the shell link path and its list of identifiers, if necessary. |
| SetArguments | Sets the arguments for a shell link object. |
| SetDescription | Sets the description string for a shell link object. |
| SetHotkey | Sets the hot key for a shell link object. |
| SetIconLocation | Sets the path and index of the icon for a shell link object. |
| SetIDList | Sets the list of item identifiers for a shell link object. |
| SetPath | Sets the path and filename of a shell link object. |
| SetRelativePath | TBD |
| SetShowCmd | Sets the show window (SW_) command for a shell link object. |
| SetWorkingDirectory | Sets the name of the working directory for a shell link object. |

Like all OLE interfaces, IShellLink also includes the QueryInterface, AddRef methods.

IShellLink::GetArguments
HRESULT STDMETHODCALLTYPE GetArguments (IsHELLLINK FAR * pShlLnk, LPSTR pszArgs, int cchMaxPath);

Retrieves the arguments associated with a shell link object. u Returns NOERROR if successful, an OLE-defined error value otherwise.

pShlLnk

Address of the IShellLink interface. In C++, this parameter is implicit.

pszArgs

Address of a buffer that receives the arguments.

cchMaxPath

Maximum number of characters to copy to the buffer specified by pszArgs.

IShellLink::GetDescription

RESULT STDMETHODCALLTYPE GetDescription (ISHELLLINK FAR * pShlLnk, LPSTR pszName, int cchMaxName);

Retrieves the description of a shell link object. u Returns NOERROR if successful, an OLE-defined error value otherwise.

pshlLnk

Address of the IShellLink interface. In C++, this parameter is implicit.

pszName

Address of a buffer that receives the description string.

cchMaxName

Maximum number of characters to copy to the buffer specified by pszName,

IShellLink::GetHotkey

HRESULT STDMETHODCALLTYPE GetHotkey (ISHELLLINK FAR * pShlLnk, WORD *pwHotkey);

Retrieves the hot key for a shell link object. u Returns NOERROR if successful, an OLE-defined error value otherwise.

pShlLnk

Address of the IShellLink interface. In C++, this parameter is implicit.

pwHotkey

Address of the hot key. The virtual-key code is in the low-order byte, and the modifier flags are in the high-order byte. The modifier flags can be a combination of these values:

| Value | Meaning |
|---|---|
| HOTKEYF_ALT | ALT key |
| HOTKEYF_CONTROL | CTRL key |
| HOTKEYF_EXT | Extended key |
| HOTKEYF_SHIFT | SHIFT key |

IShellLink: :GetIconLocation

HRESULT STDMETHODCALLTYPE GetIconLocation (ISHELLLINK FAR * pShlLnk, LPSTR pszIconPath, int cchIconPath, int *piIcon);

Retrieves the location of the icon for a shell link object. u Returns NOERROR if successful, an OLE-defined error value otherwise.

pshlLnk

Address of the IShellLink interface. In C++, this parameter is implicit.

pszIconPath

Address of a buffer that receives the path of the file containing the icon.

cchIconPath

Maximum number of characters to copy to the buffer specified by pszIconPath.

piIcon

Address of a value that receives the index of the icon.

IShellLink::GetIDList

HRESULT STDMETHODCALLTYPE GetIDList (ISHELLLINK FAR * pShlLnk, LPITEMIDLIST * ppidl);

Retrieves the list of item identifiers for a shell link object. u Returns NOERROR if successful, an OLE-defined error value otherwise.

pShlLnk

Address of the IShellLink interface. In C++, this parameter is implicit.

ppidl

Address of a pointer to a list of item identifiers.

IShellLink::GetPath

HRESULT STDMETHODCALLTYPE GetPath(IShellLink FAR * pShlLnk, LPSTR pszFile, int cchMaxPath, WIN32_FIND_DATA *pfd, DWORD fFlags);

Retrieves the path and filename of a shell link object. u Returns NOERROR if successful, an OLE-defined error value otherwise.

pShlLnk

Address of the IShellLink interface. In C++, this parameter is implicit.

pszFile

Address of a buffer that receives the path and filename of the shell link object.

cchMaxPath

Maximum number of bytes to copy to the buffer specified by pszfile.

pfd

Address of a WIN32_FIND_DATA structure that contains information about the shell link object.

fFlags

Flags that specify the type of path information to retrieve. Can be a combination of these values:

| Value | Meaning |
|---|---|
| SLGP_SHORTPATH | Retrieves the standard short (8.3) filename. |
| SLGP_UNCPRIORITY | Retrieves the Universal Naming Convention (UNC) path name of the file. |

IShellLink::GetShowCmd

HRESULT STDMETHODCALLTYPE GetShowCmd (ISHELLLINK FAR * pShlLnk, int *piShowCmd);

Retrieves the show command for a shell link object. u Returns NOERROR if successful, an OLE-defined error value otherwise.

pshlLnk

Address of the IShellLink interface. In C++, this parameter is implicit.

piShowCmd

Address of the show command. For a list of show commands, see the description of the ShowWindow function.

IShellLink::GetWorkingDirectory

HRESULT STDMETHODCALLTYPE GetWorkingDirectory(ISHELLLINK FAR * pShlLnk, LPSTR pszDir, int cchMaxPath);

Retrieves the name of the working directory for a shell link object. u Returns NOERROR if successful, an OLE-defined error value otherwise.

pShlLnk

Address of the IShellLink interface. In C++, this parameter is implicit.
pszDir
Address of a buffer that receives the name of the working directory.
cchMaxPath
Maximum number of characters to copy to the buffer specified by pszDir. The name of the working directory is truncated if it is longer than cchMaxPath.

IShellLink::Resolve
HRESULT STDMETHODCALLTYPE Resolve (ISHELLLINK FAR * pShlLnk, HWND hwnd, DWORD fFlags);

Resolves a shell link. The system searches for the shell link object and updates the shell link path and its list of identifiers, if necessary. u Returns NOERROR if successful, an OLE-defined error value otherwise.
pShlLnk
Address of the IShellLink interface. In C++, this parameter is implicit.
hwnd
Handle of the window that the shell uses as the parent window for a dialog box. The shell displays the dialog box if it needs to prompt the user for more information while resolving a shell link..
fFlags
Action flags. Can be a combination of the following values:

| Value | Meaning |
| --- | --- |
| SLR_ANY_MATCH | TBD |
| SLR_NO_UI | Prevents the shell from displaying a dialog box if it cannot resolve the shell link. |
| SLR_UPDATE | Directs the shell to update the path to the link and the list of identifiers if the link object has been changed. |

When this method is called, the shell retrieves the path associated with the current link object and searches for the object in that path. If the shell finds the object, it resolves the link; otherwise, the shell searches the same path for an object with the same file creation time and attributes, but with a different name. This resolves a link to an object that has been renamed. If the shell still has not found the link object, the system searches the subdirectories of the current directory. It does a recursive search of the directory to looking for a match with either the name or the creation time. If it does not find a match, the shell displays a dialog box prompting the user for a location. An application can suppress the dialog box by specifying the SLR_NO_UI flag when calling IShellLink::Resolve.

IShellLink::SetArguments
HRESULT STDMETHODCALLTYPE SetArguments (ISHELLLINK FAR * pShlLnk, LPCSTR pszgs);

Sets the arguments for a shell link object. This method is useful when creating a link to an application that takes flags as arguments, such as a compiler. u Returns NOERROR if successful, an OLE-defined error value otherwise.
pShlLnk
Address of the IShellLink interface. In C++, this parameter is implicit.
pszArgs
Address of a buffer that contains the new arguments.
IShellLink::SetDescription
HRESULT STDMETHODCALLTYPE SetDescription (ISHELLLINK FAR * pShlLnk, LPCSTR pszName);

Sets the description of a shell link object. The description can be any application-defined string. u Returns NOERROR if successful, an OLE-defined error value otherwise.
pShlLnk
Address of the IShellLink interface. In C++, this parameter is implicit.
pszName
Address of a buffer containing the new description string.

IShellLink::SetHotkey
HRESULT STDMETHODCALLTYPE SetHotkey (ISHELLLINK FAR * pShlLnk, WORD wHotkey);

Sets the hot key for a shell link object. Setting a hot key allows the user to invoke the object by pressing a particular combination of keys. u Returns NOERROR if successful, an OLE-defined error value otherwise.
pshlLnk
Address of the IShellLink interface. In C++, this parameter is implicit.
wHotkey
Hot key. The virtual-key code is in the low-order byte, and the modifier flags are in the high-order byte. The modifier flags can be a combination of the values specified in the description of IShellLink::GetHotkey.

IShellLink::SetIconLocation
HRESULT STDMETHODCALLTYPE SetIconLocation (ISHELLLINK FAR * pShlLnk, LPCSTR pszIconPath, int iIcon);

Sets the location of the icon for a shell link object. u Returns NOERROR if successful, an OLE-defined error value otherwise.
pShlLnk
Address of the IShellLink interface. In C++, this parameter is implicit.
pszIconPath
Address of a buffer that contains the path of the file containing the icon.
iIcon
Index of icon.

IShellLink::SetIDList
HRESULT STDMETHODCALLTYPE SetIDList (ISHELLLINK FAR * pShlLnk, LPCITEMIDLIST pidl);

Sets the list of item identifiers for a shell link object. This method is useful when an application needs to set a shell link to an object that is not a file, such as a Control Panel application, a printer, or another computer. u Returns NOERROR if successful, an OLE-defined error value otherwise.
pShlLnk
Address of the IShellLink interface. In C++, this parameter is implicit.
pidl
Address of a list of item identifiers.

IShellLink::SetPath
HRESULT STDMETHODCALLTYPE SetPath (ISHELLLINK FAR * pShlLnk, LPCSTR pszFile);

Sets the path to a shell link object. u Returns NOERROR if successful, an OLE-defined error value otherwise.
pShlLnk
Address of the IShellLink interface. In C++, this parameter is implicit.
pszfile
Address of a buffer that contains the new path.

IShellLink::SetRelativePath
HRESULT STDMETHODCALLTYPE SetRelativePath (ISHELLLINK EAR * pShlLnk, LPCSTR pszPathRel, LPCITEMIDLIST pidlRel);

TBD
u Returns NOERROR if successful, an OLE-defined error value otherwise.
pShlLnk
Address of the IShellLink interface. In C++, this parameter is implicit.
pszPathRel
TBD
pidlRel
TBD IShellLink::SetShowCmd
HRESULT STDMETHODCALLTYPE SetShowCmd (ISHELLLINK FAR * pShlLnk, int iShowCmd);
Set the show command for a shell link object. The show command sets the show state of the window. u Returns NOERROR if successful, an OLE-defined error value otherwise.
pShlLnk
Address of the IShellLink interface. In C++, this parameter is implicit.
iShowCmd
Show command. It can be one of the show commands listed in the description of the ShowWindow function.

IShellLink::SetWorkingDirectory
HRESULT STDMETHODCALLTYPE SetWorkingDirectory(ISHELLLINK FAR * pShlLnk, LPCSTR pszDir);
Sets the working directory for a shell link object. u Returns NOERROR if successful, an OLE-defined error value otherwise.
pShlLnk
Address of the IShellLink interface. In C++, this parameter is implicit.
pszDir
Address of a buffer that contains the name of the new working directory.
The working directory must be set only if the object requires it to be set. For example, if an application creates a shell link to a Microsoft Word document that uses a template that resides in a different directory, the application would use this method to set the working directory.

We claim:

1. A method in a computer system for transferring selected data to one of a plurality of preferred filesystem destinations, the method comprising the steps of:
   in response to user input constituting a send command, identifying a plurality of preferred filesystem destinations from among a multiplicity of all possible filesystem destinations;
   displaying an indication for each of the identified plurality of preferred filesystem destinations;
   in response to user input, selecting one of the displayed filesystem destination indications; and
   initiating a data transfer of the selected data to the filesystem destination whose indication is selected.

2. The method of claim 1, further including the step of transforming the selected data into a transferable form, and wherein the initiating step initiates a data transfer of the transformed selected data to the user-specified filesystem destination whose indication is selected.

3. The method of claim 1, further comprising the step of, before the displaying step, adding a filesystem destination to the plurality of preferred filesystem destinations under the control of a user, such that the added filesystem destination is among those displayed in the displaying step in response to user input.

4. The method of claim 1, further comprising the step of, before the displaying step, removing a filesystem destination from the plurality of preferred filesystem destinations under the control of a user, such that the removed filesystem destination is not displayed in the displaying step.

5. The method of claim 1 wherein the displaying step includes the step of retrieving from a preselected folder the identities of the identified plurality of preferred filesystem destinations, the method further including the step of adding an indication for a new filesystem destination to those displayed in the displaying step by adding the identity of the new filesystem destination to the preselected folder in response to user input.

6. A method in a computer system having a display device and an input device, the method for transferring filesystem objects to common filesystem destinations, comprising the steps of:
   displaying a visual indication of a filesystem object on the display device;
   receiving user input constituting a send command through the input device;
   selecting the visual indication of the filesystem object in response to the user input;
   in response to selecting the visual indication of the filesystem object, displaying a single list of one or more potential filesystem destinations to which the filesystem object may be transferred that is a proper subset of the potential filesystem destinations to which the filesystem object may be transferred;
   selecting one of the displayed potential filesystem destinations in response to user input; and
   initiating a data transfer of the filesystem object to the selected filesystem potential destination.

7. The method of claim 6, further including the step of transforming the object into a transferable form, and wherein the initiating step initiates a data transfer of the transformed filesystem object to the selected potential destination.

8. The method of claim 6, further including the step of, before the step of displaying a list of one or more potential filesystem destinations, receiving a data transfer request from a user.

9. The method of claim 3, further including the step of, in response to selecting the visual indication of the object in response to user input, displaying in conjunction with the visual indication of the object a context menu containing a list of one or more commands which the user may select to apply to the object, the contained list of commands including a transfer command,
   and wherein the step of displaying one or more potential filesystem destinations is performed in response to the selection by the user of the transfer command.

10. An apparatus for transferring source filesystem objects to filesystem destinations in response to user input constituting a send command, comprising:
   a common filesystem destination memory for storing the identities of common filesystem destinations that are a proper subset of available filesystem destinations to which source filesystem objects are frequently transferred;
   an object selection detector for detecting the selection of a source filesystem object;
   a display device for displaying a single list containing indications of at least a portion of the common filesystem destinations whose identities are stored in the common filesystem destinations memory when the selection detector detects the selection of a source filesystem object, the single list excluding any filesystem destination from among the common filesystem destinations identified by the common filesystem destination memory;

a destination indication selection detector for detecting the selection of one of the indications of common filesystem destinations displayed by the display device; and an object transfer or for transferring the source filesystem object whose selection was detected by the object selection detector to the filesystem destination whose selection is detected by the destination indication selection detector.

11. The apparatus of claim 10, further comprising a configuration subsystem for changing the identities of common destination objects stored in the common destination memory under the control of a user, such that the display device displays indications of the destination objects whose identities are changed by the configuration subsystem.

12. A computer-readable medium whose contents cause a computer system having a display device and an input device to transfer an object to one of a list of common filesystem destinations by performing the steps of:

displaying a visual indication of a filesystem object on the display device;

receiving user input constituting a send command through the input device;

selecting the visual indication of the filesystem object in response to the user input;

in response to selecting the visual indication of the filesystem object, displaying a single, non-hierarchical list of one or more potential filesystem destinations to which the filesystem object may be transferred;

selecting one of the displayed potential filesystem destinations in response to user input; and initiating a data transfer of the filesystem object to the selected filesystem potential destination.

* * * * *